United States Patent
Lee

(10) Patent No.: US 9,254,870 B2
(45) Date of Patent: Feb. 9, 2016

(54) METHOD OF GENERATING OPTIMUM PARKING PATH OF UNMANNED DRIVING VEHICLE, AND UNMANNED DRIVING VEHICLE ADOPTING THE METHOD

(71) Applicant: HANWHA TECHWIN CO., LTD., Changwon-si (KR)

(72) Inventor: Jin Han Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/276,089

(22) Filed: May 13, 2014

(65) Prior Publication Data

US 2015/0134185 A1    May 14, 2015

(30) Foreign Application Priority Data

Nov. 8, 2013 (KR) .......................... 10-2013-0135836

(51) Int. Cl.
  *B62D 15/02*  (2006.01)
  *G05D 1/02*   (2006.01)

(52) U.S. Cl.
  CPC .......... *B62D 15/0285* (2013.01); *G05D 1/0214* (2013.01); *G05D 2201/0213* (2013.01)

(58) Field of Classification Search
  CPC ... G05D 1/0212; G05D 1/0214; G08G 1/168; B62D 6/00; B62D 15/025; B62D 15/0265; B62D 15/027; B62D 15/0275; B62D 15/028; B62D 15/0285; B60R 2300/806; B60W 30/06
  See application file for complete search history.

(56) References Cited

U.S. PATENT DOCUMENTS

| | | | |
|---|---|---|---|
| 6,061,002 A * | 5/2000 | Weber et al. | 340/932.2 |
| 6,275,754 B1 * | 8/2001 | Shimizu et al. | 701/41 |
| 6,356,828 B1 * | 3/2002 | Shimizu et al. | 701/41 |
| 8,457,844 B2 * | 6/2013 | Widmann | 701/42 |
| 2007/0285041 A1 | 12/2007 | Jones et al. | |
| 2009/0278709 A1 * | 11/2009 | Endo et al. | 340/932.2 |
| 2010/0161128 A1 * | 6/2010 | Choi et al. | 700/258 |
| 2010/0235053 A1 * | 9/2010 | Iwakiri et al. | 701/42 |
| 2011/0251755 A1 * | 10/2011 | Widmann | 701/36 |
| 2012/0316732 A1 * | 12/2012 | Auer | 701/41 |
| 2013/0151059 A1 * | 6/2013 | Widmann | 701/23 |
| 2013/0335553 A1 * | 12/2013 | Heger et al. | 348/118 |
| 2014/0055615 A1 * | 2/2014 | Chen | 348/148 |

FOREIGN PATENT DOCUMENTS

| | | |
|---|---|---|
| EP | 2 292 498 A2 | 3/2011 |
| EP | 2 374 661 A1 | 10/2011 |
| JP | 2009-157430 A | 7/2009 |
| KR | 10-2010-0073078 A | 7/2010 |
| KR | 10-2012-0054879 A | 5/2012 |
| KR | 10-2013-0019908 A | 2/2013 |
| WO | 2012/080044 A1 | 6/2012 |

OTHER PUBLICATIONS

Communication dated Jun. 1, 2015 issued by the European Patent Office in counterpart Application No. 14 177 965.2.

* cited by examiner

*Primary Examiner* — Thomas G Black
*Assistant Examiner* — Ce Li
(74) *Attorney, Agent, or Firm* — Sughrue Mion, PLLC

(57) ABSTRACT

A method of generating an optimum parking path of an unmanned driving vehicle which is performed by a controller in the unmanned driving vehicle, wherein the controller changes a moving distance for a plurality of operations in a reference parking path, finds a parking path in which an average obstacle distance, which is an average distance between at least one near-to-path obstacle and the unmanned driving vehicle, is longest among a plurality of candidate parking paths, and sets the parking path having the longest average obstacle distance, as an optimum parking path in response to the longest average obstacle distance being longer than a predetermined limited distance.

11 Claims, 15 Drawing Sheets

FIG. 10
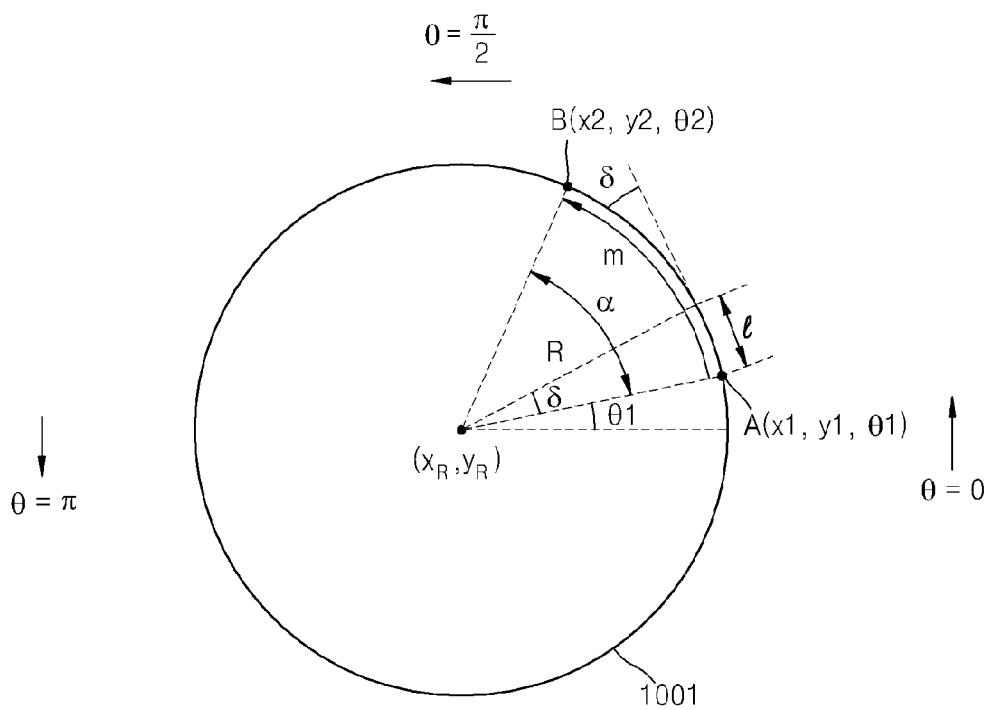
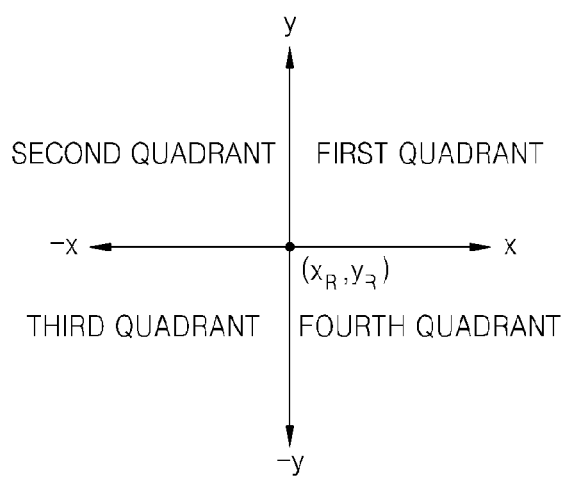

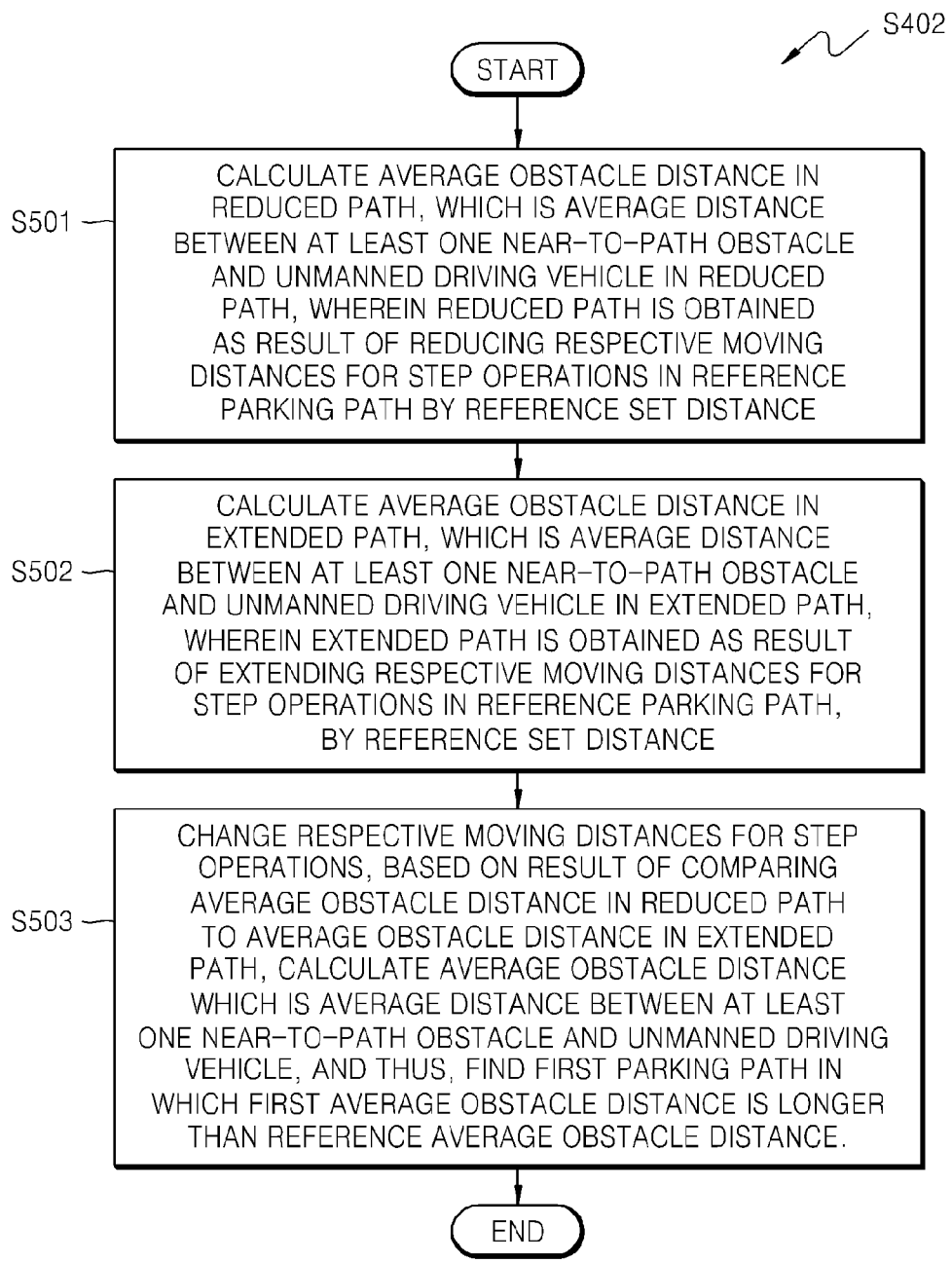

METHOD OF GENERATING OPTIMUM PARKING PATH OF UNMANNED DRIVING VEHICLE, AND UNMANNED DRIVING VEHICLE ADOPTING THE METHOD

RELATED APPLICATIONS

This application claims priority from Korean Patent Application No. 10-2013-0135836, filed on Nov. 8, 2013, in the Korean Intellectual Property Office, the disclosure of which is incorporated herein in its entirety by reference.

BACKGROUND

1. Field

One or more embodiments relate to a method of generating an optimum parking path of an unmanned driving vehicle and an unmanned driving vehicle adopting the method. In particular, exemplary embodiments relate to a method of generating an optimum parking path of an unmanned driving vehicle, which is performed by a control unit included in the unmanned driving vehicle, and the unmanned driving vehicle adopting the method.

2. Description of the Related Art

A related art unmanned driving vehicle, for example, a related art unmanned driving robot may include a sensor unit, a current location estimation unit, a neighboring map generation unit, a control unit, a driving unit, a mechanical unit, and a wireless communication unit.

The sensor unit, which includes various sensors, generates location-related information and nearby obstacle information, and inputs the generated location-related information and the generated nearby obstacle information respectively to the current location estimation unit, the neighboring map generation unit, and the control unit.

The current location estimation unit estimates a current location according to the location-related information and the nearby obstacle information, which are obtained from the sensor unit, and inputs current location information, which is obtained as a result of the estimating, to the control unit.

The neighboring map generation unit generates a neighboring map according to reference map information and the location-related information that is obtained from the sensor unit, and inputs neighboring map information, which is obtained as a result of the generating of the neighboring map, to the control unit.

The control unit communicates with a user terminal via the wireless communication unit, and controls operation of the driving unit according to information that is input from the sensor unit, the current location estimation unit, and the neighboring map generation unit.

The driving unit operates according to a control signal transmitted from the control unit, to drive the mechanical unit.

By using such a method of generating a parking path of an unmanned driving vehicle, a related art unmanned driving vehicle generates a partial parking path and moves toward a target arrival location designated by a user through a remote control.

Moreover, according to a related art method of generating a parking path, a possibility of success in parking a vehicle may be low. Further, it may take a long time to park a vehicle.

Accordingly, there is still a need to generate, in advance, an optimum parking path in advance of an unmanned driving vehicle, so that the unmanned driving vehicle moves along the generated parking path.

However, a problem in generating an optimum parking path is that various numerous candidate parking paths are present between a current location and a target arrival location of the unmanned driving vehicle.

Even if it is assumed that candidate parking paths are all known, it takes a lot of time to determine whether an unmanned driving vehicle may collide with an obstacle for each candidate parking path.

SUMMARY

Exemplary embodiments may include a method of efficiently and quickly generating an optimum parking path, regardless of a presence of various unknown candidate parking paths between a current location and a target arrival location of an unmanned driving vehicle.

Exemplary embodiments may include an unmanned driving vehicle adopting the method of generating the optimum parking path.

Additional aspects will be set forth in part in the description which follows and, in part, will be apparent from the description, or may be learned by practice of the presented embodiments.

According to an aspect of an exemplary embodiment, a method of generating an optimum parking path of an unmanned driving vehicle, is performed by a controller in the unmanned driving vehicle.

The controller may generate a reference parking path by selectively combining a plurality of operations such as head-in straight driving, head-out straight driving, head-in left turning, head-out left turning, head-in right turning, and head-out right turning.

The controller may change a moving distance in the reference parking path to find a parking path in which an average obstacle distance, which is an average distance between at least one near-to-path obstacle and the unmanned driving vehicle, is longest among a plurality of candidate parking paths.

The controller may set the parking path, having a longest average obstacle distance, as an optimum parking path in response to the longest average obstacle distance being longer than a predetermined limited distance.

According to an aspect of another exemplary embodiment, a method of generating an optimum parking path of an unmanned driving vehicle may include receiving a parking command signal, generating a reference parking path by combining a plurality of parking operations which comprise head-in straight driving, head-out straight driving, head-in left turning, head-out left turning, head-in right turning, and head-out right turning in response to receiving the parking command signal, and changing a moving distance in the reference parking path to find a parking path in which an average obstacle distance between at least one near-to-path obstacle and the unmanned driving vehicle is longest among a plurality of candidate parking paths.

According to the exemplary embodiments, an unmanned driving vehicle adopts the method of generating the optimum parking path.

BRIEF DESCRIPTION OF THE DRAWINGS

These and/or other aspects will become apparent and more readily appreciated from the following description of the embodiments, taken in conjunction with the accompanying drawings in which:

FIG. 10 is a diagram for explaining a method of obtaining an X-axis coordinate x2, a Y-axis coordinate y2, and a directed angle of orientation θ2 of a point B, if the unmanned driving vehicle of FIG. 9 rotationally moves from a point A to the point B with a certain rotational angle δ;

FIG. 17 is a diagram for explaining a second example of step S402 of FIG. 12.

DETAILED DESCRIPTION OF THE EXEMPLARY EMBODIMENTS

Figure 1:
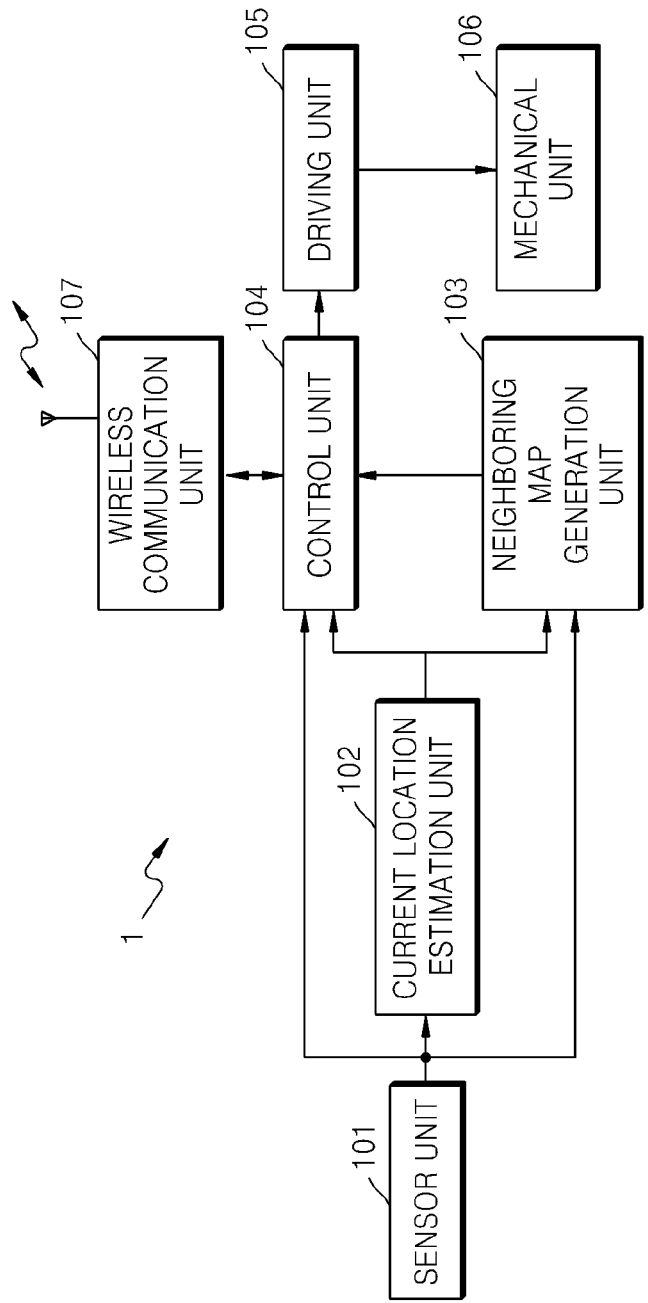
FIG. 1 is a diagram of an internal configuration of an unmanned driving vehicle adopting a method of generating an optimum parking path, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The following description and accompanying drawings are provided for a better understanding of the exemplary embodiments. In the following description, well-known functions or constructions are not described in detail if it is determined that they would obscure the exemplary embodiments due to unnecessary detail.

The following description and drawings are not intended to restrict the scope of the exemplary embodiments, and the scope of the exemplary embodiments should be defined by the appended claims. The terms used in the following description are merely used to describe particular embodiments, and are not intended to limit the exemplary embodiments.

Hereinafter, exemplary embodiments will be described in detail with reference to the accompanying drawings. However, the exemplary embodiments are not limited to the description set forth herein. Like reference numerals denote like elements throughout the drawings.

FIG. 1 is a diagram of an internal configuration of an unmanned driving vehicle 1 adopting a method of generating an optimum parking path according to an embodiment.

Referring to FIG. 1, in the current embodiment, the unmanned driving vehicle 1 adopting the method of generating an optimum parking path, for example, an unmanned driving robot, includes a sensor unit 101, a current location estimation unit 102, a neighboring map generation unit 103, a control unit 104, a driving unit 105, a mechanical unit 106, and a wireless communication unit 107.

In an exemplary embodiment, any of the sensor unit 101, the current location estimation unit 102, the neighboring map generation unit 103, the control unit 104, the driving unit 105, the mechanical unit 106, and the wireless communication unit 107 may include at least one processor, a hardware module, a random access memory, or a circuit for performing their respective functions.

In another exemplary embodiment, any of the function of the sensor unit 101, the current location estimation unit 102, the neighboring map generation unit 103, the control unit 104, the driving unit 105, the mechanical unit 106, and the wireless communication unit 107 may be performed by a non-transitory computer readable medium. The non-transitory computer readable medium may be, for example, a compact disc, a digital versatile disk, a hard disc, a bluray disc, a memory card, a read only memory, etc.

The sensor unit 101, which includes various sensors, generates location-related information and nearby obstacle information, and inputs the generated location-related information and the generated nearby obstacle information respectively to the current location estimation unit 102, the neighboring map generation unit 103, and the control unit 104.

The current location estimation unit 102 estimates a current location according to the location-related information and the nearby obstacle information which are obtained from the sensor unit and inputs current location information, which is obtained as a result of the estimating, to the control unit 104.

The neighboring map generation unit 103 generates a neighboring map according to reference map information and location-related information that is obtained from the sensor unit 101, and inputs neighboring map information, which is obtained as a result of the generating of the neighboring map, to the control unit 104.

The control unit 104 communicates with a user terminal via the wireless communication unit 107, and controls operation of the driving unit 105 according to information that is input from the sensor unit 101, the current location estimation unit 102, and the neighboring map generation unit 103.

The driving unit 105 operates according to a control signal transmitted from the control unit 104, to drive the mechanical unit 106.

Figure 2:
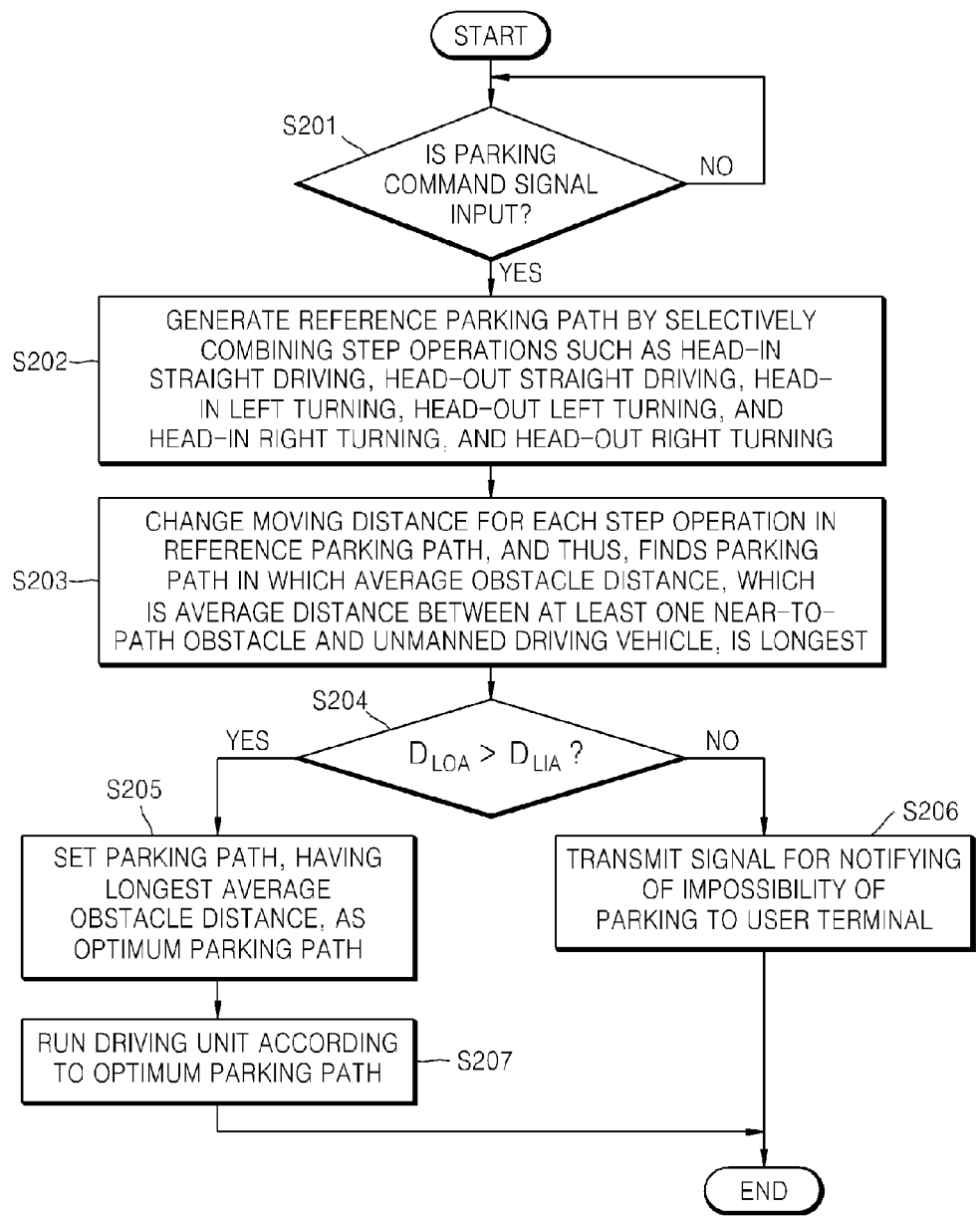
FIG. 2 is a diagram for showing a parking-related operation performed by a control unit of FIG. 1.

FIG. 2 is a diagram for showing a parking-related operation of the control unit 104 of FIG. 1. Referring to FIGS. 1 and 2, the parking-related operation of the control unit 104 is described below.

If a parking command signal is input from a user terminal via the wireless communication unit 107 in step S201, the control unit 104 generates a reference parking path by selectively combining step operations such as head-in straight driving, head-out straight driving, head-in left turning, head-out left turning, and head-in right turning, and head-out right turning in step S202.

In step S202, a reference parking path is generated as a shortest-distance path assuming that a near-to-path obstacle is not present.

Then, in step S203, the control unit 104 changes a moving distance for each step operation in the reference parking path, and thus, finds a parking path in which an average obstacle distance, which is an average distance between at least one near-to-path obstacle and the unmanned driving vehicle 1, is longest.

In steps S202 and S203, a same rotational angle is applied to head-in left turning, head-out left turning, head-in right turning, and head-out right turning. Accordingly, only a moving distance may be applied as a variable of each step operation.

Then, if a longest average obstacle distance $D_{LOA}$ is longer than a set limited distance $D_{LIA}$ in step S204, the control unit 104 sets the parking path, having the longest average obstacle distance $D_{LOA}$, as an optimum parking path in step S205. Additionally, in step S207, the control unit 104 runs the driving unit 105 according to the set optimum parking path.

If the longest average obstacle distance $D_{LOA}$ is not longer than the set limited distance $D_{LIA}$ in step S204, the control unit 104 transmits a signal for notifying the user terminal about the impossibility of parking, via the wireless communication unit 107 in step S206.

According to the parking-related operation described above, the control unit 104 changes a moving distance for each step operation in the reference parking path. Thus, the control unit 104 finds a parking path in which an average obstacle distance, which is an average distance between at least one near-to-path obstacle and the unmanned driving vehicle 1, is longest.

Since an optimum parking path is found as a moving path for each step operation in the changed reference parking path, even though various unknown candidate parking paths are present between a current location and a target arrival location of the unmanned driving vehicle 1, an optimum parking path may be generated efficiently and quickly.

For example, the control unit 104 may set a parking path, to which an average obstacle distance converges, as an optimum parking path, by reducing or extending each moving distance in step operations in a direction in which an average obstacle distance may be increased.

Figure 3:
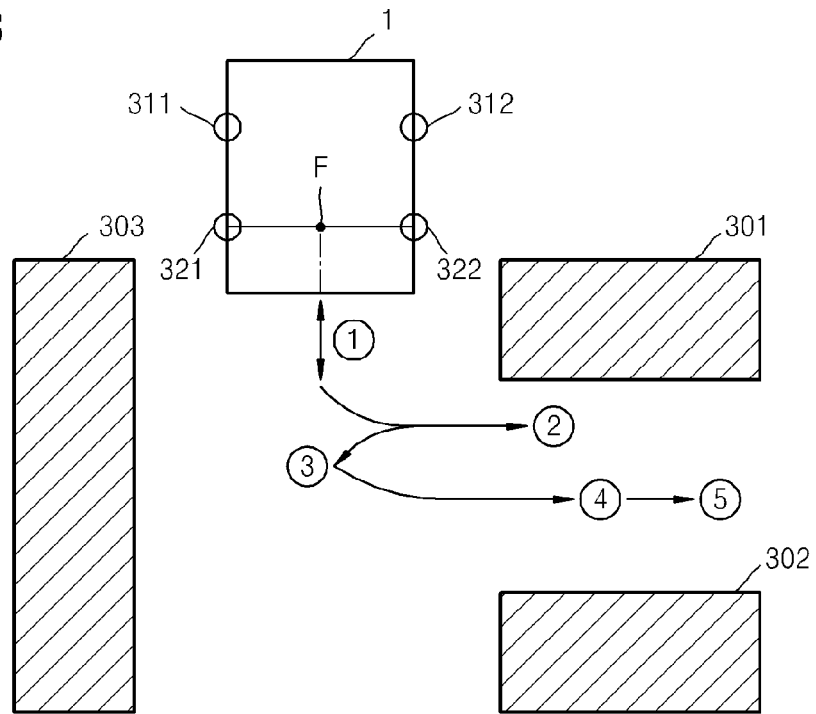
FIG. 3 is a diagram for showing an example of a reference parking path generated by performing step S202 of FIG. 2, if the control unit of FIG. 1 receives a command to perform head-out parking in a right target position.

FIG. 3 is a diagram for showing an example of a reference parking path generated by performing step S202 of FIG. 2, if the control unit 104 of FIG. 1 receives a command to perform head-out parking in a right target position. Reference numerals 301 through 303 in FIG. 3 denote near-to-path obstacles.

In the current embodiment, the unmanned driving vehicle 1 includes two front wheels 311 and 312 and two rear wheels 321 and 322. Additionally, a location reference point F of the unmanned driving vehicle 1 is set as a center point between the two rear wheels. A reference parking path is generated as a shortest-distance path assuming that a near-to-path obstacle is not present.

Referring to FIG. 3, if the control unit 104 receives a command to perform head-out parking in a right target position, a reference parking path is generated by setting 5 step operations in sequence as shown below.

① Head-in (or head-out) straight driving=>② Head-out right turning>=③ Head-in left turning=>④ Head-out right turning=>⑤ Head-out straight driving A same rotational angle is applied to head-out right turning, head-in left turning, and head-out right turning. Accordingly, only a moving distance may be applied as a variable of each step operation. For example, a reference parking path is generated as shown below.

① Head-in (or head-out) straight driving for 0 m=>② Head-out right turning for 0.5 m=>③ Head-in left turning for 0.5 m=>④ Head-out right turning for 4.5 m=>⑤ Head-out straight driving for 2 m.

Head-in (or head-out) straight driving for 0 m in step operation ① refers to a step operation that does not need to be performed. The reference parking path, shown in the above example, may be applied using a negative number, as shown below.

① Straight driving for 0 m=>② Right turning for −0.5 m=>③ Left turning for 0.5 m=>④ Right turning for −4.5 m=>⑤ Straight driving for −2 m.

Figure 4:
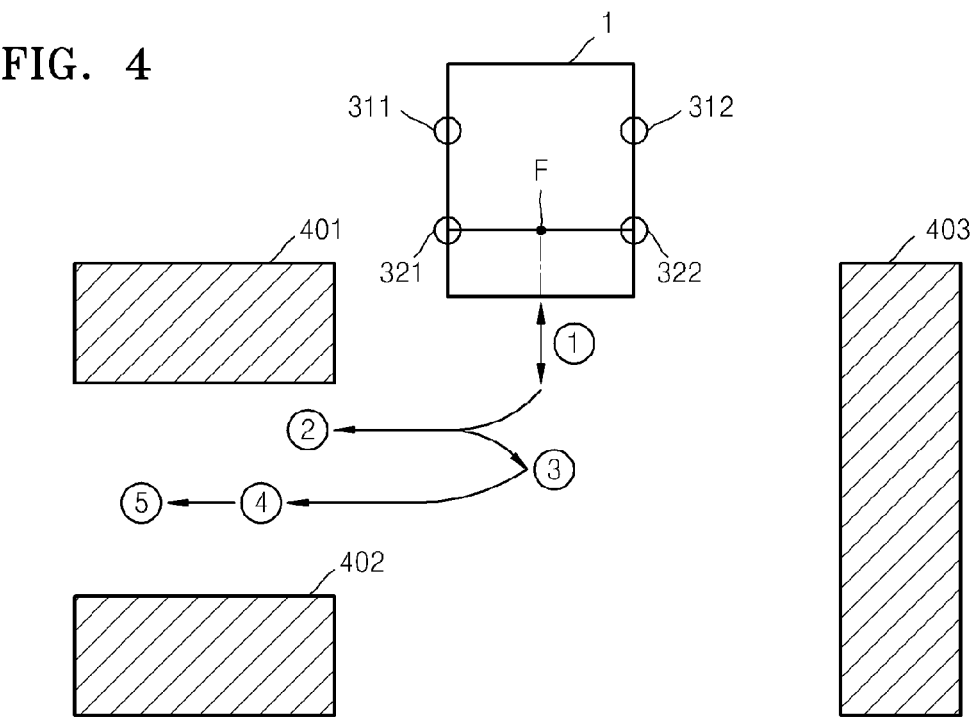
FIG. 4 is a diagram for showing an example of a reference parking path generated by performing step S202 of FIG. 2, if the control unit of FIG. 1 receives a command to perform head-out parking in a left target position.

FIG. 4 shows an example of a reference parking path generated by performing step S202 of FIG. 2, if the control unit 104 of FIG. 1 receives a command to perform head-out parking in a left target position. Like reference numerals shown in both FIGS. 3 and 4 denote elements having a same function. Reference numerals 401 through 403, shown in FIG. 3, denote near-to-path obstacles.

Referring to FIG. 4, if the control unit 104 receives a command to perform head-out parking in a left target position, a reference parking path is generated by setting 5 step operations in sequence, as shown below.

① Head-in (or head-out) straight driving=>② Head-out left turning=>③ Head-in right turning=>④ Head-out left turning=>⑤ Head-out straight driving A same rotational angle is applied to head-out left turning, head-in right turning, and head-out left turning. Accordingly, only a moving distance may be applied as a variable of each step operation. For example, a reference parking path is generated as shown below.

① Head-in (or head-out) straight driving for 0 m=>② Head-out left turning for 0.5 m=>③ Head-in right turning for 0.5 m=>④ Head-out left turning for 4.5 m=>⑤ Head-out straight driving for 2 m Head-in (or head-out) straight driving for 0 m in step operation ① refers to a step operation that does not need to be performed. The reference parking path, shown in the above example, may be applied using a negative number, as shown below.

Figure 5:
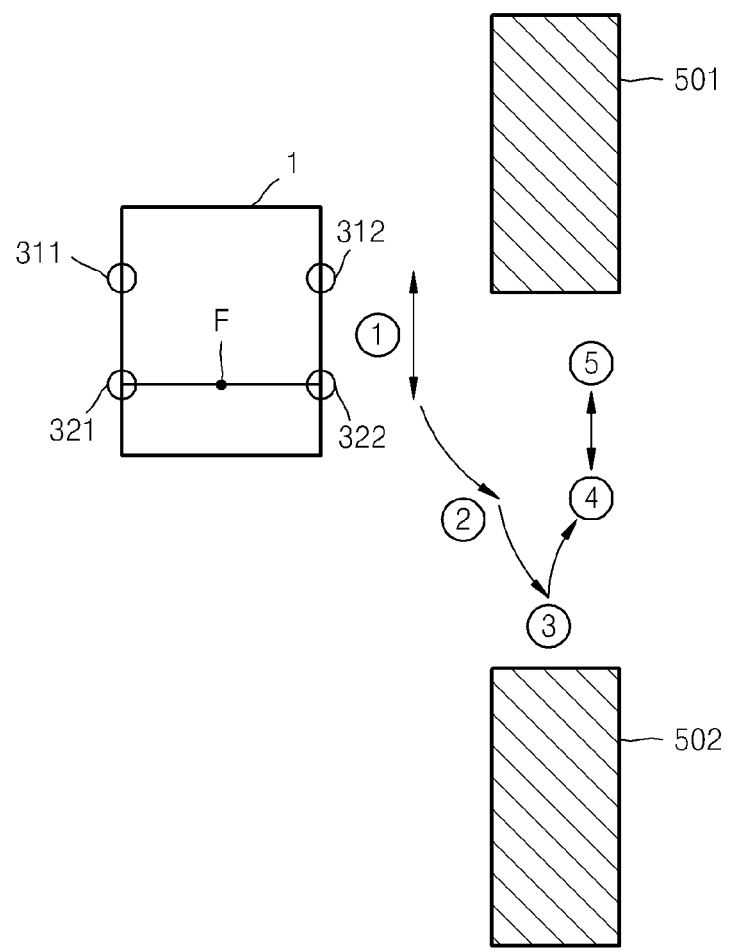
FIG. 5 is a diagram for showing an example of a reference parking path generated by performing step S202 of FIG. 2, if the control unit of FIG. 1 receives a command to perform parallel parking in a right target position.

① Straight driving for 0 m=>② Left turning for −0.5 m=>③ Right turning for −0.5 m=>④ Left turning for −4.5 m=>⑤ Straight driving for −2 m FIG. 5 is a diagram for showing an example of a reference parking path generated by performing step S202 of FIG. 2, if the control unit 104 of FIG. 1 receives a command to perform parallel parking in a right target position. Like reference numerals shown in FIGS. 3 through 5 denote elements having a same function. Reference numerals 501 and 502, shown in FIG. 5, denote near-to-path obstacles.

Referring to FIG. 5, if the control unit 104 receives a command to perform parallel parking in a right target position, a reference parking path is generated by setting 5-step operations in sequence, as shown below.

①Head-in (or head-out) straight driving=>②Head-out right turning=>③Head-out left turning=>④Head-in right turning=>⑤Head-in (head-out) straight driving A same rotational angle is applied to head-out right turning, head-out left turning, and head-in right turning. Accordingly, only a moving distance may be applied as a variable of each step operation. For example, a reference parking path is generated as shown below.

①Head-in (or head-out) straight driving for 0 m=>②Head-out right turning for 2.5 m=>③Head-out left turning for 2.5 m=>④Head-in right turning for 0.5 m=>⑤Head-in (head-out) straight driving for 0 m Head-in (or head-out) straight driving for 0 m in step operations ① and ⑤ refers to a step operation that does not need to be performed. The reference parking path, shown in the above example, may be applied using a negative number, as shown below.

①Straight driving for 0 m=>②Right turning for −2.5 m=>③Left turning for −2.5 m=>④Right turning for 0.5 m=>⑤Straight driving for 0 m.

Figure 6:
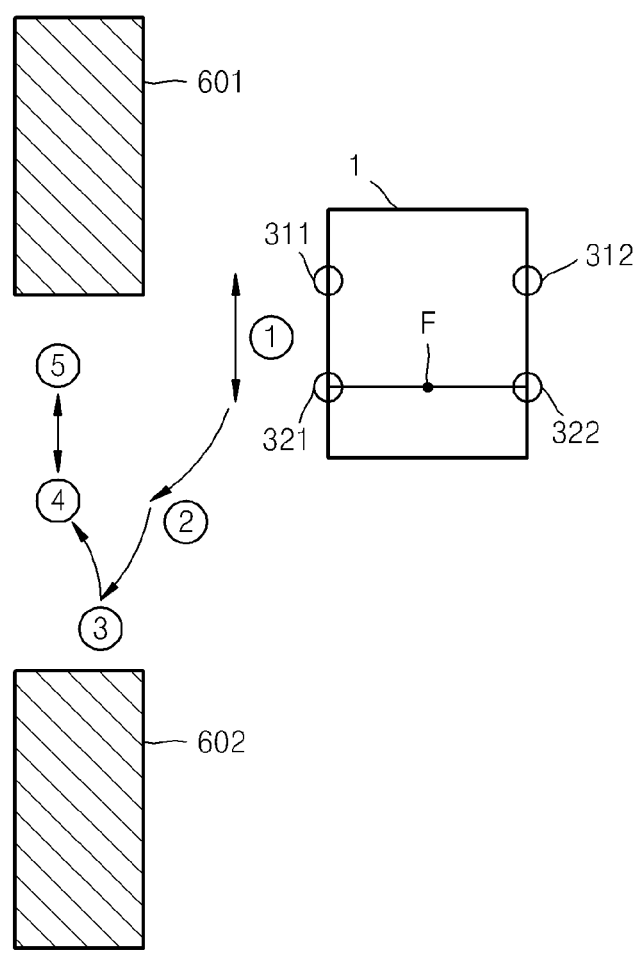
FIG. 6 is a diagram for showing an example of a reference parking path generated by performing step S202 of FIG. 2, if the control unit of FIG. 1 receives a command to perform parallel parking in a left target position.

FIG. 6 is a diagram for showing an example of a reference parking path generated by performing step S202 of FIG. 2, if the control unit 104 of FIG. 1 receives a command to perform parallel parking in a left target position. Like reference numerals shown in FIGS. 3 through 6 denote elements having a same function. Reference numerals 601 through 602, shown in FIG. 6, denote near-to-path obstacles.

Referring to FIG. 6, if the control unit 104 receives a command to perform parallel parking in a left target position, a reference parking path is generated by setting 5 step operations in sequence, as shown below.

①Head-in (or head-out) straight driving=>②Head-out left turning=>③Head-out right turning=>④Head-in left turning=>⑤Head-in (head-out) straight driving A same rotational angle is applied to head-out left turning, head-out right turning, and head-in left turning. Accordingly, only a moving distance may be applied as a variable of each step operation. For example, a reference parking path is generated as shown below.

①Head-in (or head-out) straight driving for 0 m=>②Head-out left turning for 2.5 m=>③Head-out right turning for 2.5 m=>④Head-in left turning for 0.5 m=>⑤Head-in (head-out) straight driving for 0 m Head-in (or head-out) straight driving for 0 m in step operations ① and ⑤ refers to a step operation that does not need to be performed. The reference parking path, shown in the above example, may be applied using a negative number, as shown below.

①Straight driving for 0 m=>②Left turning for −2.5 m=>③Right turning for −2.5 m=>④Left turning for 0.5 m=>⑤Straight driving for 0 m.

Figure 7:
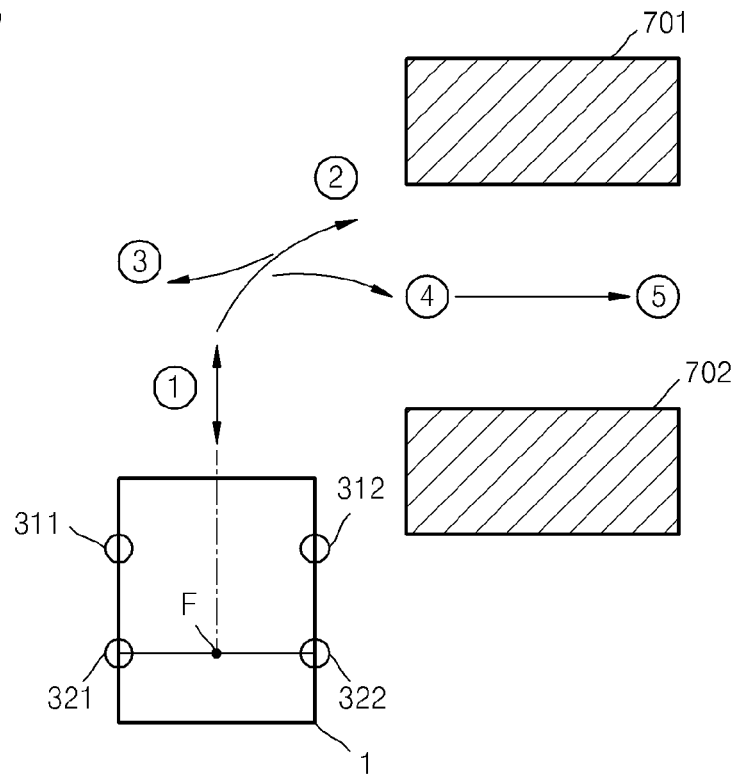
FIG. 7 is a diagram for showing an example of a reference parking path generated by performing step S202 of FIG. 2, if the control unit of FIG. 1 receives a command to perform head-in parking in a right target position.

FIG. 7 is a diagram for showing an example of a reference parking path generated by performing step S202 of FIG. 2, if the control unit of FIG. 1 receives a command to perform head-in parking in a right target position. Like reference numerals shown in FIGS. 3 through 7 denote elements having a same function. Reference numerals 701 and 702, shown in FIG. 7, denote near-to-path obstacles.

Referring to FIG. 6, if the control unit 104 receives a command to perform parallel parking in a right target position, a reference parking path is generated by setting 5-step operations in sequence as shown below.

①Head-in (or head-out) straight driving=>②Head-in right turning=>③Head-out left turning=>④Head-in right turning=>⑤Head-in (head-out) straight driving A same rotational angle is applied to head-in right turning, head-out left turning, and head-in right turning. Accordingly, only a moving distance may be applied as a variable of each step operation. For example, a reference parking path is generated as shown below.

①Head-in (or head-out) straight driving for 0 m=>②Head-in right turning for 1 m=>③Head-out left turning for 1 m=>④Head-in right turning for 1 m=>⑤Head-in (head-out) straight driving for 5 m Head-in (or head-out) straight driving for 0 m in step operation ① refers to a step operation that does not need to be performed. The reference parking path, shown in the above example, may be applied using a negative number, as shown below.

①Straight driving for 0 m=>②Right turning for 1 m=>③Left turning for −1 m=>④Right turning for 1 m=>⑤Straight driving for 5 m.

Figure 8:
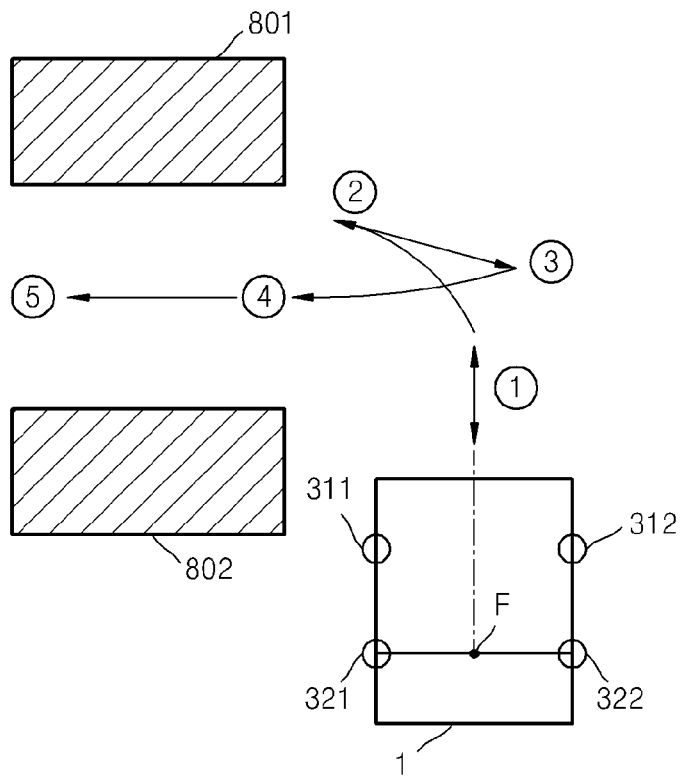
FIG. 8 is a diagram for showing an example of a reference parking path generated by performing step S202 of FIG. 2, if the control unit of FIG. 1 receives a command to perform head-in parking in a left target position.

FIG. 8 is a diagram for showing an example of a reference parking path generated by performing step S202 of FIG. 2, if the control unit 104 of FIG. 1 receives a command to perform head-in parking in a left target position. Like reference numerals shown in FIGS. 3 through 8 denote elements having a same function. Reference numerals 801 and 802, shown in FIG. 8, denote near-to-path obstacles.

Referring to FIG. 6, if the control unit 104 receives a command to perform head-in parking in a left target position, a reference parking path is generated by setting 5 step operations in sequence as shown below.

①Head-in (or head-out) straight driving=>②Head-out left turning=>③Head-out right turning=>④Head-in left turning=>⑤Head-in straight driving A same rotational angle is applied to head-out left turning, head-out right turning, and head-in left turning. Accordingly, only a moving distance may be applied as a variable of each step operation. For example, a reference parking path is generated as shown below.

①Head-in (or head-out) straight driving for 0 m=>②Head-out left turning for 1 m=>③Head-out right turning for 1 m=>④Head-in left turning for 1 m=>⑤Head-in straight driving for 5 m Head-in (or head-out) straight driving for 0 m in step operation ① refers to a step operation that does not need to be performed. The reference parking path, shown in the above example, may be applied simply by using a negative number, as shown below.

Figure 9:
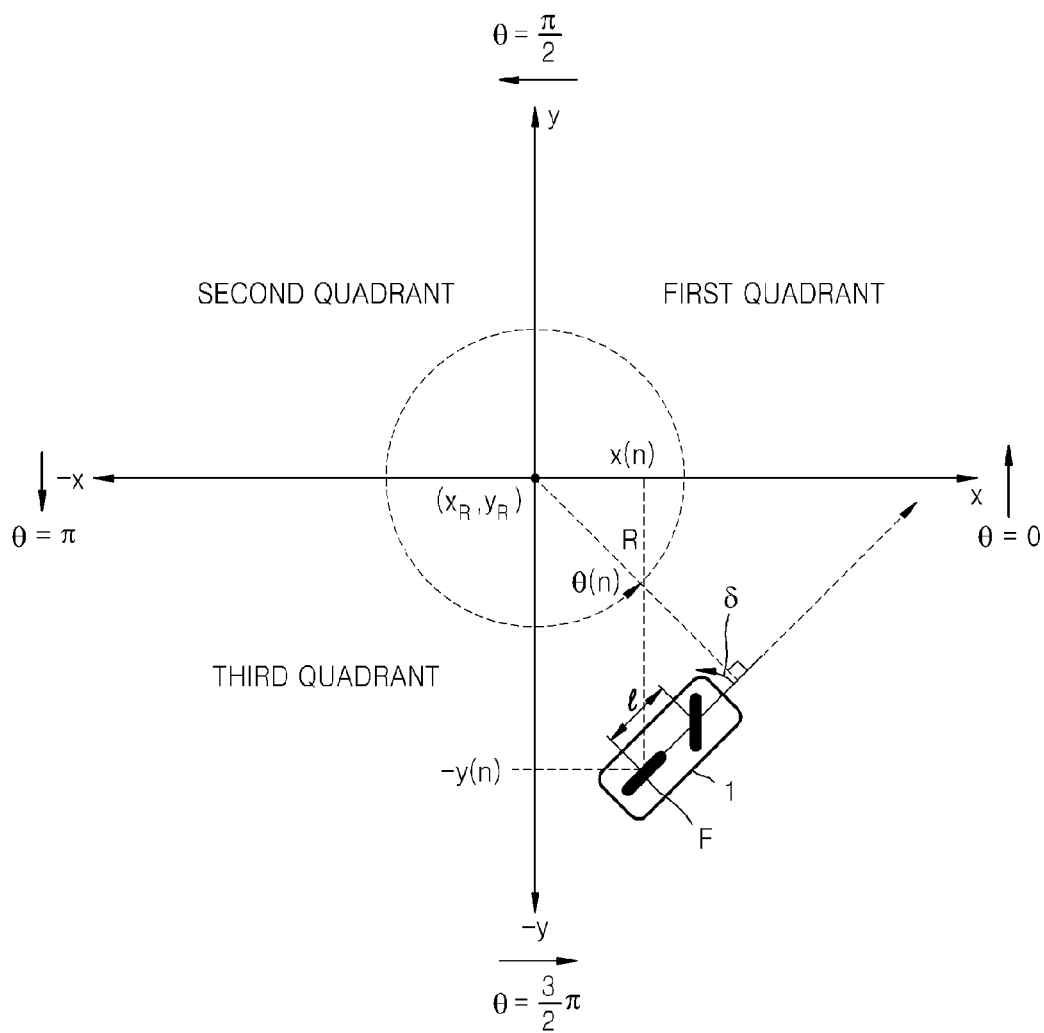
FIG. 9 is a diagram for showing that if an unmanned driving vehicle virtually moves rotationally, an X-axis coordinate x1, a Y-axis coordinate −y1, and a directed angle of orientation θ1 of the unmanned driving vehicle are obtained by using a virtual circle 1001, shown in FIG. 10, which is obtained by rotationally moving the unmanned driving vehicle 1 with a rotational angle δ, in steps S202 and S203 of FIG. 2.

①Straight driving for 0 m=>②Left turning for 1 m=>③Right turning for −1 m=>④Left turning for 1 m=>⑤Straight driving for 5 m FIG. 9 is a diagram showing that if an unmanned driving vehicle virtually moves rotationally, an X-axis coordinate x1, a Y-axis coordinate −y1, and a directed angle of orientation θ1 of the unmanned driving vehicle are obtained using a virtual circle 1001 shown in FIG. 10. The virtual circle 1001 in FIG. 10 is obtained by rotationally moving the unmanned driving vehicle 1 by a rotational angle δ, in steps S202 and S203 of FIG. 2.

FIG. 10 is a diagram for explaining a method of obtaining an X-axis coordinate x2, a Y-axis coordinate y2, and a directed angle of orientation θ2 of a point B, if the unmanned driving vehicle of FIG. 9 rotationally moves from a point A to the point B by a certain rotational angle δ.

Like reference numerals shown in FIGS. 3 through 8 and FIGS. 9 and 10 denote elements having a same function. In FIGS. 9 and 10, a reference numeral x(−x) represents an X-coordinate axis, y(−y) represents a Y-coordinate axis, θ represents a directed angle of orientation, δ represents a common rotational angle, ($x_R$, $y_R$) represents a coordinate of a center of the virtual circle 1001, R represents a radius of the virtual circle 1001, I represents a space between a front wheel and a rear wheel, x(n) represents an nth X-axis coordinate, −y(n) represents an nth Y-axis coordinate, θ(n) represents an nth directed angle of orientation, x1 represents a first X-axis coordinate, y1 represents a first Y-axis coordinate, θ1 represents a first directed angle of orientation, x2 represents a second X-axis coordinate, y2 represents a second Y-axis coordinate, θ2 represents a second directed angle of orientation, m represents a rotational movement distance, and a represents a rotational movement angle.

Referring to FIGS. 9 and 10, as described with respect to steps S202 and S203 of FIG. 2, a same rotational angle δ is applied to head-in left turning, head-out left turning, head-in right turning, and head-out right turning.

Additionally, as described with respect to step S203 of FIG. 2, assuming that the unmanned driving vehicle 1 moves through each parking path, whenever the unmanned driving vehicle 1 virtually moves for a unit movement distance, an X-axis coordinate x(n), a Y-axis coordinate y(n), and a directed angle of orientation θ(n) of a center point F between two rear wheels of the unmanned driving vehicle 1 are calculated.

It is assumed that the center point F between the two rear wheels is rotationally moved from the first X-axis coordinate x1, the first Y-axis coordinate y1, and the first directed angle of orientation θ1 to the second X-axis coordinate x2, the second Y-axis coordinate y2, and the second directed angle of orientation θ2, according to one operation from among head-in left turning, head-out left turning, head-in right turning, and head-out right turning. In this case, the second X-axis coordinate x2, the second Y-axis coordinate y2, and the second directed angle of orientation θ2 are calculated using the virtual circle 1001 which is obtained by rotationally moving the unmanned driving vehicle 1 by a rotational angle δ. This may be described in detail as follows.

The second directed angle of orientation θ2 is obtained using Equation 1 shown below.

$$θ2 = α + θ1$$ [Equation 1]

In Equation 1, α represents a rotational movement angle in a clockwise direction, and θ1 represents the first directed angle of orientation that is already obtained. If a rotational movement is in a counter-clockwise direction, the rotational movement angle α, shown in Equation 1, is replaced with −α. The rotational movement angle α is obtained by using Equation 2 shown below.

$$α = \frac{m}{R}$$ [Equation 2]

In Equation 2, m represents a rotational movement distance of the unmanned driving vehicle 1, and R represents a radius of the virtual circle 1001 that is obtained by rotationally moving the unmanned driving vehicle 1.

The radius R in Equation 2 is obtained by using Equation 3 shown below.

$$R = \frac{1}{\tan δ}$$ [Equation 3]

In Equation 3, I represents a space between a front wheel and a rear wheel of the unmanned driving vehicle 1, and δ represents a certain rotational angle.

Accordingly, the second directed angle of orientation θ(2) may be obtained using Equations 1 through 3 shown above.

The second X-axis coordinate x2 is obtained using Equation 4.

$$x2 = \cos θ2 * R + x_R$$ [Equation 4]

In Equation 4, * represents a multiplication symbol, θ2 represents the second directed angle of orientation shown in Equation 1, R represents the radius shown in Equation, and $x_R$ represents an X-axis coordinate of a center of the virtual circle 1001. The X-axis coordinate $x_R$ of a center of the virtual circle 1001 is obtained using Equation 5 shown below.

$$x_R = −\sin θ1 * R + x1$$ [Equation 5]

In Equation 5, * represents a multiplication symbol, θ1 represents the first directed angle of orientation that is already obtained, R represents the radius shown in Equation 3, and x1 represents the first X-axis coordinate that is already obtained.

The second Y-axis coordinate y2 is obtained using Equation 6.

$$y2 = \sin θ2 * R + y_R$$ [Equation 6]

In Equation 6, * represents a multiplication symbol, θ2 represents the second directed angle of orientation shown in Equation 1, R represents the radius shown in Equation 3, and $y_R$ represents a Y-axis coordinate of the center of the virtual circle 1001. The Y-axis coordinate $y_R$ of the center of the virtual circle 1001, shown in FIG. 6, is obtained using Equation 7 shown below.

$$y_R = \cos θ1 * R + y1$$ [Equation 7]

In Equation 7, * represents a multiplication symbol, θ1 represents the first directed angle of orientation that is already obtained, R represents the radius shown in Equation 3, and y1 represents the first Y-axis coordinate that is already obtained.

Figure 11:
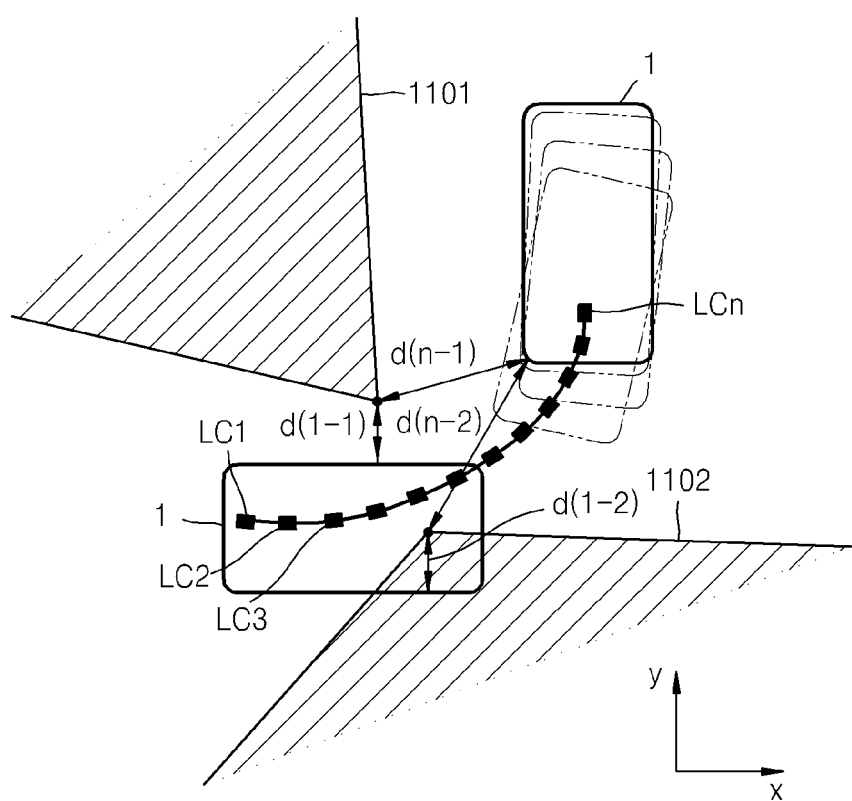
FIG. 11 is a diagram for explaining a process of calculating an average distance between at least one near-to-path obstacle and the unmanned driving vehicle for one parking path in step S203 of FIG. 2.

FIG. 11 is a diagram for explaining a process of calculating an average distance between at least one of near-to-path obstacles 1101 and 1102 and the unmanned driving vehicle 1 in one parking path in step S203 of FIG. 2.

Referring to FIG. 11, in order to calculate an average distance between the two near-to-path obstacles 1101 and 1102 and the unmanned driving vehicle 1 in one parking path, the control unit 104, shown in FIG. 1, assumes that positions of the unmanned driving vehicle 1 are disposed to overlap with each other along the parking path. In FIG. 11, reference numerals LC1 through LCn represent overlapping disposition locations in which positions of the unmanned driving vehicle 1 are disposed to overlap with each other, d(1−1) represents a shortest distance to the first near-to-path obstacle 1101 in a first disposition location LC1, d(1−2) represents a shortest distance to the second near-to-path obstacle 1102 in the first disposition location LC1, d(n−1) represents a shortest distance to the first near-to-path obstacle 1101 in the nth disposition location LCn, and d(n−2) represents a shortest distance to the second near-to-path obstacle 1102 in the nth disposition location LCn, respectively.

Based on such an assumption, the control unit 104, shown in FIG. 1, calculates shortest distances d(1–1) through d(n–2) between the respective near-to-path obstacles 1101 and 1102 and the unmanned driving vehicle 1 in the respective disposition locations LC1 through LCn. Then, the control unit 104 totals results of the calculating of respective shortest distances d(1–1) through d(n–1), and sets a value that is obtained by the totaling of the results as the average distance between the at least one near-to-path obstacle and the unmanned driving vehicle 1.

When a shortest distance between the respective near-to-path obstacles 1101 and 1102 and the respective overlapping unmanned driving vehicles is to be calculated based on the assumption described above, if the near-to-path obstacle 1102 is present inside the unmanned driving vehicle 1 in the disposition location LC1, the shortest distance may be a shortest distance between an outer surface of the unmanned driving vehicle 1 and the near-to-path obstacle 1102, and thus, have a negative value.

Figure 12:
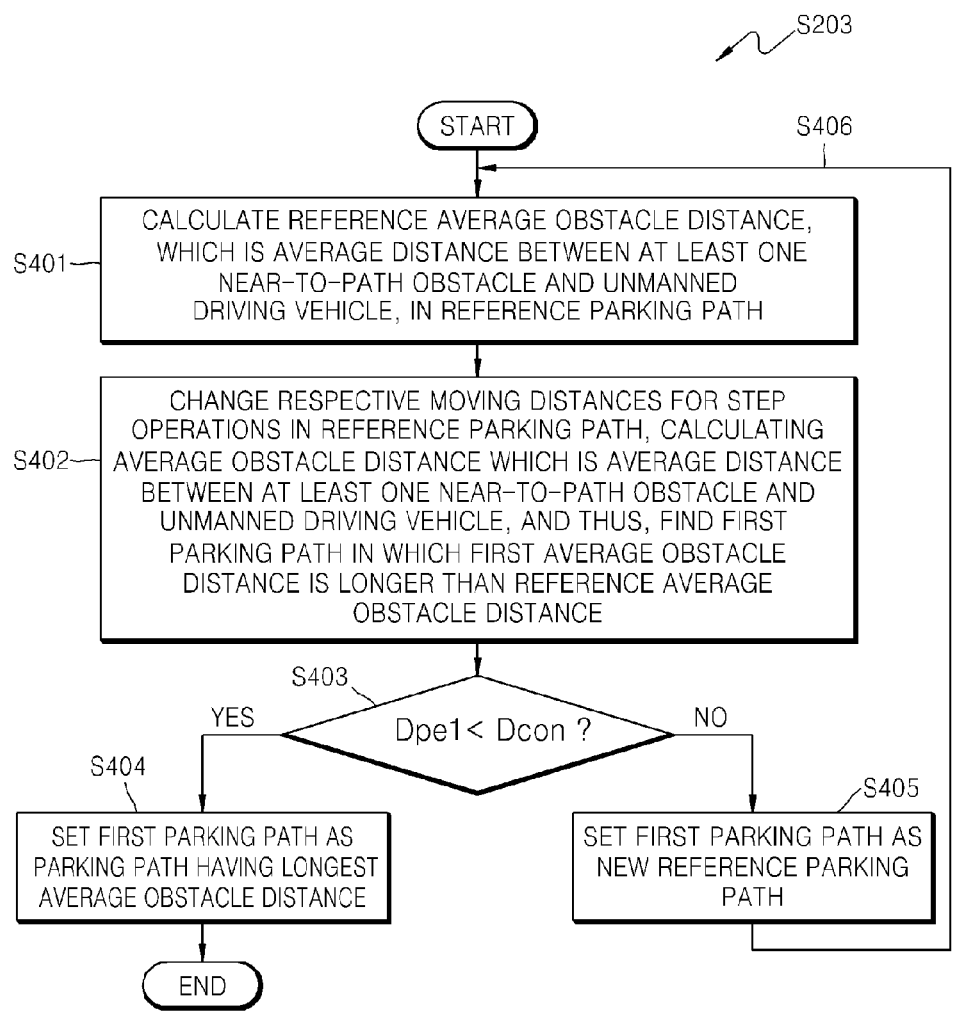
FIG. 12 is a flowchart of a detailed process of step S203 of FIG. 2.
Figure 13:
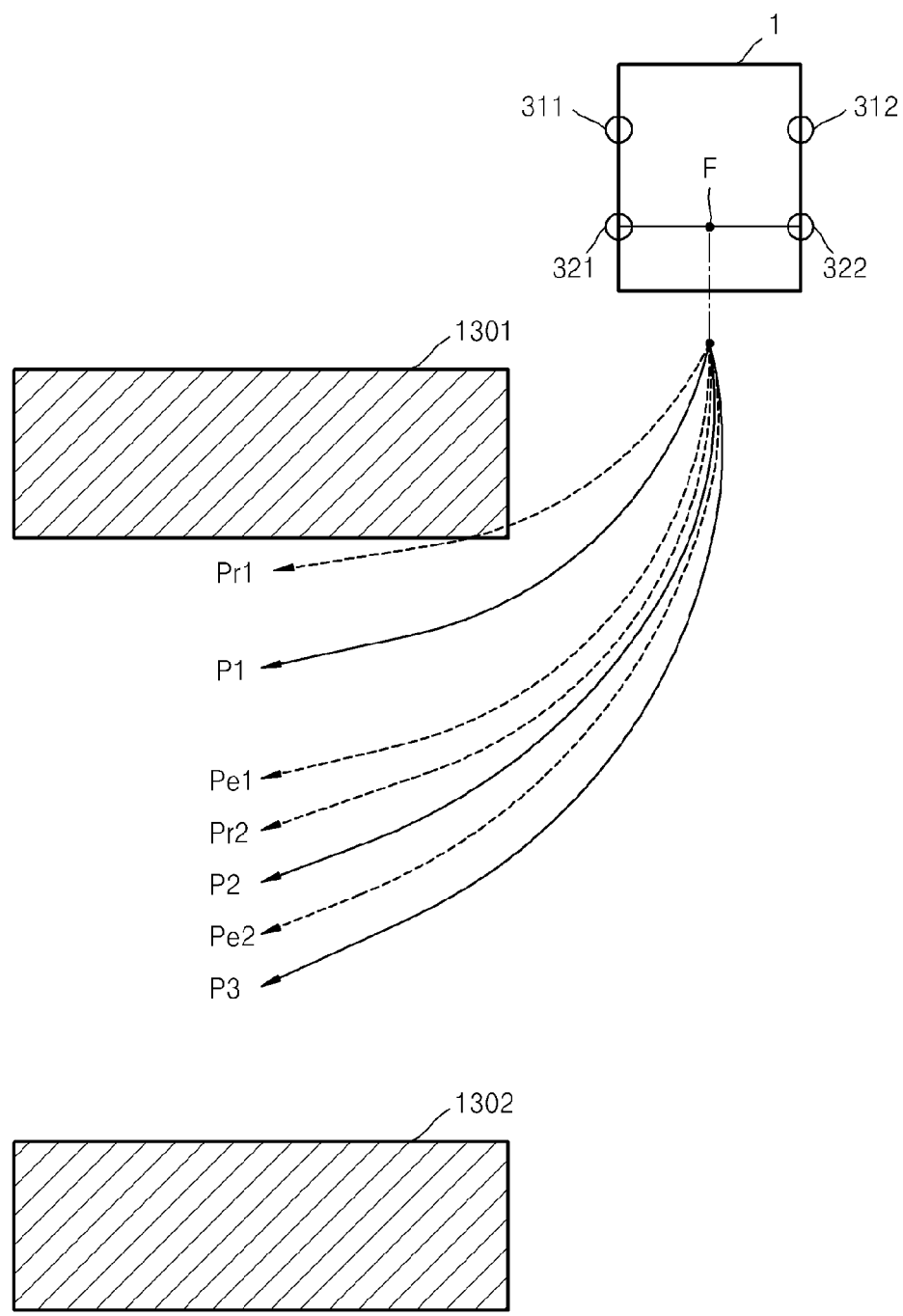
FIG. 13 is a diagram for explaining a first example of step S402 of FIG. 12.
Figure 14:
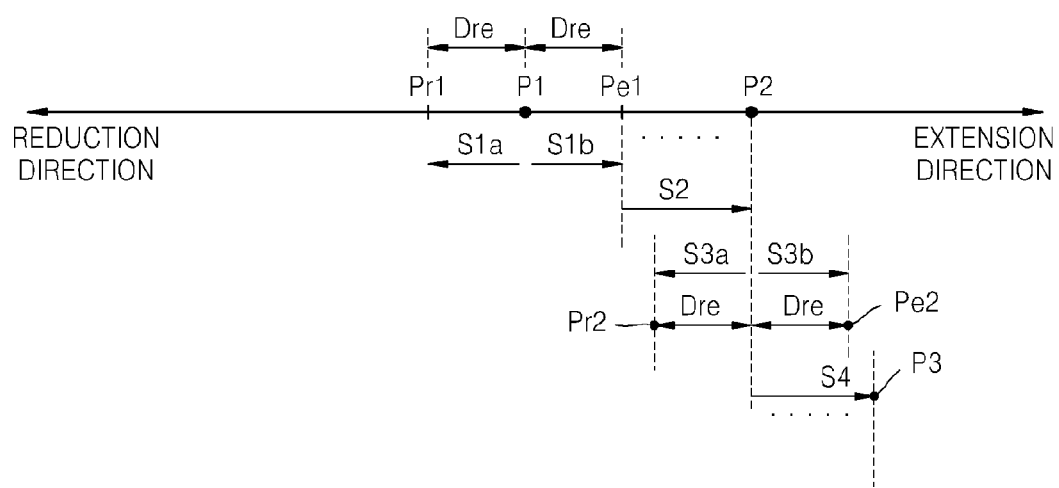
FIG. 14 is a diagram for showing a state of a change in a moving distance that is common to respective step operations, with regard to the example of FIG. 13.
Figure 15:
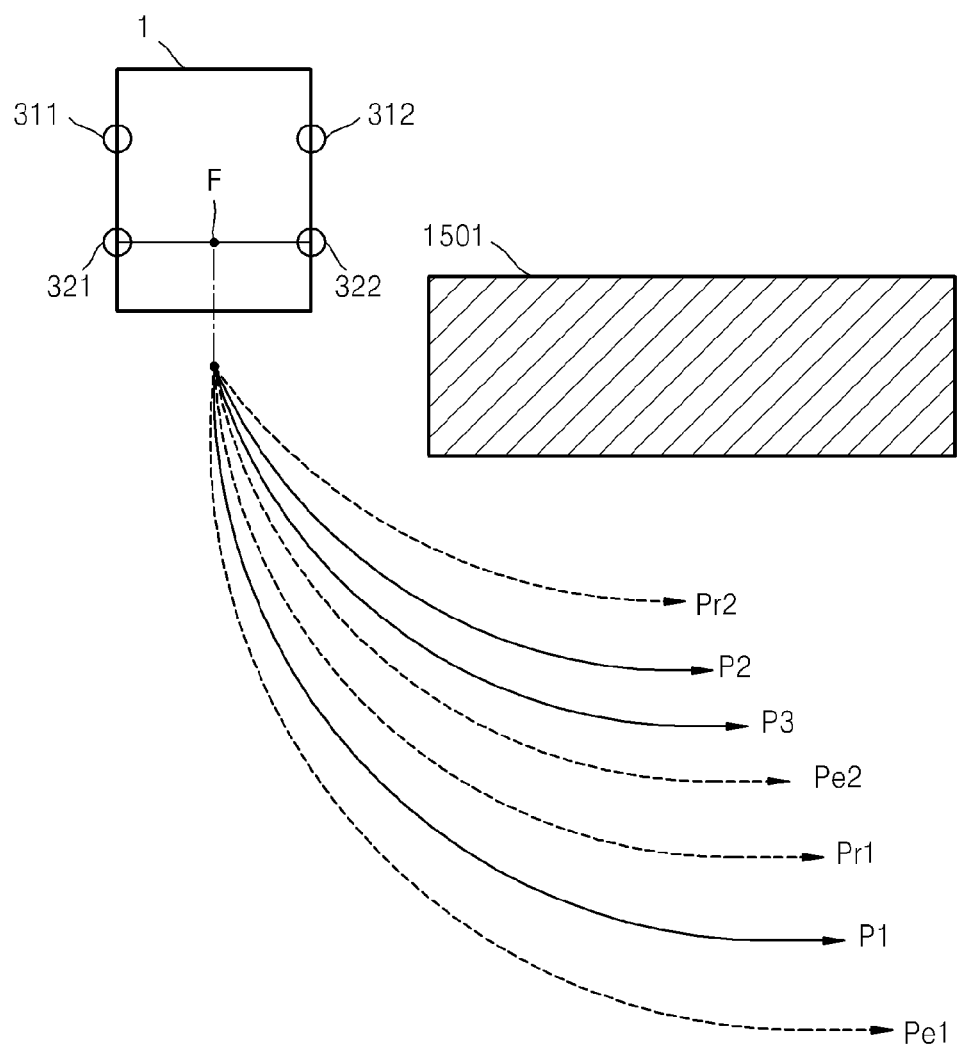
FIG. 15 is a diagram for explaining a second example of step S402 of FIG. 12.
Figure 16:
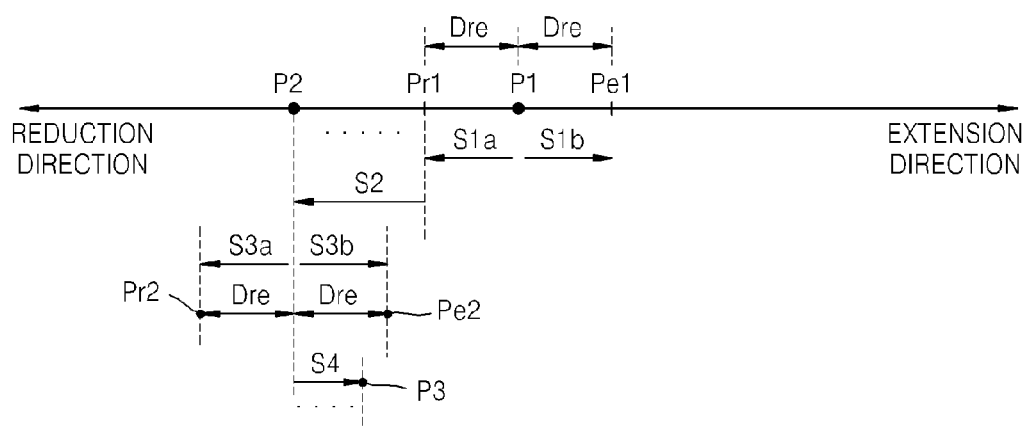
FIG. 16 is a diagram for showing a state of a change in a moving distance that is common to respective step operations, with regard to the example of FIG. 15.

FIG. 12 is a flowchart of a detailed process of step S203 of FIG. 2. FIG. 13 is a diagram for explaining a first example of step S402 of FIG. 12. FIG. 14 is a diagram for showing a state of a change in a moving distance that is common to respective step operations, with regard to the example of FIG. 13. FIG. 15 is a diagram for explaining a second example of step S402 of FIG. 12. FIG. 16 is a diagram for showing a state of a change in a moving distance that is common to respective step operations, with regard to the example of FIG. 15. Like reference numerals shown in both FIGS. 3 and 8 and FIGS. 13 through 16 denote elements having a same function.

In FIGS. 13 through 16, reference numerals 1301, 1302, 1501, and 1502 represent near-to-path obstacles, P1 represents a reference parking path, Pr1 represents a first reduced path, Pe1 represents a first extended path, P2 represents a first parking path, Pr2 represents a second reduced path, Pe2 represents a second extended path, P3 is a second parking path, Dre represents a reference set distance, S1*a* represents a state of a change in a moving distance in a reduction direction, S1*b* represents a state of a change in a moving distance in an extension direction, S2 represents a state of a change in a moving distance in an extension direction, S3*a* represents a state of a change in a moving distance in a reduction direction, S3*b* represents a state of a change in a moving distance in an extension direction, and S4 represents a state of a change in a moving distance in an extension direction.

Referring to FIGS. 12 through 16, a detailed process of step S203 of FIG. 2 is as follows.

In step S401, the control unit 104, shown in FIG. 1, calculates a reference average obstacle distance, which is an average distance between the near-to-path obstacles 1301, 1302, 1501, and 1502 and the unmanned driving vehicle 1 in the reference parking path P1.

In step S402, the control unit 104 changes respective moving distances for the step operations ① through ⑤ with respect to FIGS. 3 through 8 in the reference parking path, and thus, calculates an average obstacle distance which is an average distance between the near-to-path obstacles 1301, 1302, 1501, and 1502 and the unmanned driving vehicle 1. Thus, the control unit 104 finds a first parking path P2 in which a first average obstacle distance is longer than the reference average obstacle distance.

Then, if a difference Dpe1 between the reference average obstacle distance and the first average obstacle distance is less than a set convergence distance Dcon in step S403, the first parking path P2 is set as a parking path having a longest average obstacle distance, in step S404.

If the difference Dpe1 between the reference average obstacle distance and the first average obstacle distance is not less than the set convergence distance Dcon in step S403, the control unit 104 performs steps S405 and S406 shown below.

In step S405, the control 104 sets the first parking path P2 as a new reference parking path. Additionally, in step S406, the control unit 104 regards the new reference parking path as a reference parking path used in steps S401 through S404, and performs steps S401 through S405.

By using the set convergence distance Dcon in such a sequential search process, a parking path having a longest average obstacle distance may be quickly found.

In the current embodiment, additional conditions for finding the first parking path may be required. In other words, the first parking path, found by performing step S402, must meet three conditions as shown below.

First, a deviation between an X-axis coordinate of the unmanned driving vehicle 1 at a virtual arrival location and an X-axis coordinate of the unmanned driving vehicle 1 at a target arrival location is less than a set limit value.

Second, a deviation between a Y-axis coordinate of the unmanned driving vehicle 1 at a virtual arrival location and a Y-axis coordinate of the unmanned driving vehicle 1 at a target arrival location is less than a set limit value.

Third, a deviation between a directed angle of orientation of the unmanned driving vehicle 1 at a virtual arrival location and a directed angle of orientation of the unmanned driving vehicle 1 at a target arrival location is less than a set limit value.

FIG. 17 shows a detailed process of step S402 of FIG. 12. Referring to FIG. 13 through 17, a detailed process of step S402 of FIG. 12 is as follows.

In step S501, the control unit 104, shown in FIG. 4, calculates an average obstacle distance in the reduced path Pr1, which is an average distance between the near-to-path obstacles 1301, 1302, 1501, and 1502 and the unmanned driving vehicle 1 in the reduced path Pr1, wherein the reduced path Pr1 is obtained as a result of reducing respective moving distances for the step operations ☐ through ☐ with respect to FIGS. 3 through 8 in the reference parking path P1, by the reference set distance Dre.

In step S501, if step S402 of FIG. 12 is performed again according to step S406 of FIG. 12, a reference parking path becomes P2 shown with respect to FIGS. 13 through 16, and a reduced path thereof becomes Pr2.

Then, In step S502, the control unit 104 calculates an average obstacle distance in the extended path Pe1, which is an average distance between the near-to-path obstacles 1301, 1302, 1501, and 1502 and the unmanned driving vehicle 1 in the extended path Pe1, wherein the extended path Pe1 is obtained as a result of extending respective moving distances for the step operations ☐ through ☐ with respect to FIGS. 3 through 8 in the reference parking path P1, by the reference set distance Dre.

In step S502, if step S402 of FIG. 12 is performed again according to step S406 of FIG. 12, a reference parking path becomes P2 shown with respect to FIGS. 13 through 16, and an extended path thereof is Pe2.

Then, in step S503, the control unit 104 changes respective moving distances for the step operations ① through ⑤ with respect to FIGS. 3 through 8, based on a result of comparing the average obstacle distance in the reduced path Pr1 to the average obstacle distance in the extended path Pe1, and thus, calculates an average obstacle distance which is an average distance between the near-to-path obstacles 1301, 1302, 1501, and 1502 and the unmanned driving vehicle 1. Thus, the control unit 104 finds the first parking path P2 in which a first average obstacle distance is longer than the reference average obstacle distance.

In step S503, if step S402 of FIG. 12 is performed again according to step S406 of FIG. 12, a reference parking path becomes P2 shown with respect to FIGS. 13 through 16, a first parking path becomes P3, and the reference average obstacle distance is replaced with the first average obstacle distance.

In step S503, if an average obstacle distance in the reduced path Pr1 is longer than an average obstacle distance in the extended path Pe1, the control unit 104 reduces the respective moving distances for the step operations ① through ⑤ with respect to FIGS. 3 through 8 in the reduced path Pr1, and thus, calculates an average obstacle distance, which is an average distance between the near-to-path obstacles 1301, 1302, 1501, and 1502 and the unmanned driving vehicle 1. Thus, the control unit 104 finds the first parking path P2 in which the first average obstacle distance is longer than the reference average obstacle distance. In other words, since the first parking path P2 is searched for in a direction in which it is highly probable that the first parking path P2 is present, the desired first parking path P2 may be quickly found.

Furthermore, when respective moving distances for step operations ① through ⑤ with respect to FIGS. 3 through 8 are to be reduced in the reduced path Pr1 in step S503, a rate of reducing the moving distance is proportional to a difference between the average obstacle distance in the reduced path Pr1 and the average obstacle distance in the extended path Pe1. This is because if a difference between the average obstacle distance in the reduced path Pr1 and the average obstacle distance in the extended path Pe1 is great, it is highly probable that an average space between the reference parking path P1 and the first parking path P2 is long. Accordingly, the desired first parking path P2 may be found quickly.

Likewise, in step S503, if an average obstacle distance in the extended path Pe1 is longer than an average obstacle distance in the reduced path Pr1, the control unit 104 extends the respective moving distances for the step operations ① through ⑤ with respect to FIGS. 3 through 8 in the extended path Pe1, and thus, calculates an average obstacle distance which is an average distance between the near-to-path obstacles 1301, 1302, 1501, and 1502 and the unmanned driving vehicle 1. Thus, the control unit 104 finds the first parking path P2 in which the first average obstacle distance is longer than the reference average obstacle distance. In other words, since the first parking path P2 is searched for in a direction in which it is highly probable that the first parking path P2 is present, the desired first parking path P2 may be quickly found.

Furthermore, when respective moving distances for the step operations ① through ⑤ with respect to FIGS. 3 through 8 are to be extended in the extended path Pe1 in step S503, a rate of extending the moving distance is proportional to a difference between the average obstacle distance in the reduced path Pr1 and the average obstacle distance in the extended path Pe1. This is because if a difference between the average obstacle distance in the reduced path Pr1 and the average obstacle distance in the extended path Pe1 is great, it is highly probable that an average space between the reference parking path P1 and the first parking path P2 is long. Accordingly, the desired first parking path P2 may be found quickly.

In step S503, instead of reducing respective moving distances for the step operations ① through ⑤ with respect to FIGS. 3 through 8 in the reduced path Pr1, the control unit 104 may reduce respective moving distances for the step operations ① through ⑤ with respect to FIGS. 3 through 8 in the reference parking path P1. Additionally, instead of extending respective moving distances for the step operations ① through ⑤ with respect to FIGS. 3 through 8 in the extended path Pr1, the control unit 104 may extend respective moving distances for the step operations ① through ⑤ with respect to FIGS. 3 through 8 in the reference parking path P1.

As described above, with regard to steps S501 and S503, if step S402 of FIG. 12 is performed again according to step S406 of FIG. 12, a reference parking path becomes P2 shown with respect to FIGS. 13 through 16, a reduced path becomes Pr2, an extended path becomes Pe2, and the first parking path becomes P3. The reference average obstacle distance is replaced with the first average obstacle distance.

As described above, according to one or more of the above embodiments of a method of generating an optimum parking path of an unmanned driving vehicle and the unmanned driving vehicle adopting the method, a control unit included in the unmanned driving vehicle may change a moving distance for each step operation in a reference parking path, and thus, find a parking path in which an average obstacle distance, which is an average distance between at least one near-to-path obstacle and the unmanned driving vehicle, is longest.

Accordingly, since a respective moving distance for each step operation in the reference parking path is changed, and thus, an optimum parking path is searched for, even though various unknown candidate parking paths are present between a current location and a target arrival location of the unmanned driving vehicle, an optimum parking path may be generated efficiently and quickly.

For example, the control unit 104 may set a parking path, to which an average obstacle distance converges, as an optimum parking path, by reducing or extending each moving distance for step operations in a direction in which an average obstacle distance increases.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of generating an optimum parking path of an unmanned driving vehicle, which is performed by a controller in the unmanned driving vehicle, the method comprising:
   generating a reference parking path by selectively combining a plurality of operations which comprise head-in straight driving, head-out straight driving, head-in left turning, head-out left turning, head-in right turning, and head-out right turning;
   changing a moving distance in the reference parking path to find a parking path in which an average obstacle distance, which is an average distance between at least one near-to-path obstacle and the unmanned driving vehicle, is longest among a plurality of candidate parking paths;
   setting the parking path having the longest average obstacle distance, as the optimum parking path in response to the longest average obstacle distance being longer than a predetermined limited distance; and
   controlling the unmanned driving vehicle to perform a parking operation based on the optimum parking path, wherein the changing the moving distance further comprises:
obtaining the average distance between the at least one near-to-path obstacle and the unmanned driving vehicle in one parking path,
wherein the obtaining the average distance between the at least one near-to-path obstacle and the unmanned driving vehicle in one parking path comprises:
calculating a shortest distance between the at least one near-to-path obstacle and the unmanned driving vehicle in respective positions when assuming that the positions of the unmanned driving vehicle are disposed to overlap each other along the parking path; and
totaling results of the calculated shortest distance, and setting a value which is obtained by the totaling of the results as the average distance.

2. The method of claim 1, wherein in the calculating the shortest distance between the at least one near-to-path obstacle and the unmanned driving vehicle when assuming that the positions of the unmanned driving vehicle are disposed to overlap each other along the parking path, and
wherein the shortest distance has a negative value and is a shortest distance between an outer surface of the unmanned driving vehicle and the at least one near-to-path obstacle in response to the at least one near-to-path obstacle being present inside the unmanned driving vehicle in a location.

3. A method of generating an optimum parking path of an unmanned driving vehicle, which is performed by a controller in the unmanned driving vehicle, the method comprising:
generating a reference parking path by selectively combining a plurality of operations which comprise head-in straight driving, head-out straight driving, head-in left turning, head-out left turning, head-in right turning, and head-out right turning;
changing a moving distance in the reference parking path to find a parking path in which an average obstacle distance, which is an average distance between at least one near-to-path obstacle and the unmanned driving vehicle, is longest among a plurality of candidate parking paths;
setting the parking path having the longest average obstacle distance, as the optimum parking path in response to the longest average obstacle distance being longer than a predetermined limited distance; and
controlling the unmanned driving vehicle to perform a parking operation based on the optimum parking path,
wherein the changing the moving distance comprises:
calculating a reference average obstacle distance, which is an average distance between the at least one near-to-path obstacle and the unmanned driving vehicle in the reference parking path;
changing respective moving distances in the reference parking path;
calculating a first average obstacle distance which is the first average distance between the at least one near-to-path obstacle and the unmanned driving vehicle such that a first parking path is found in which the first average obstacle distance is longer than the reference average obstacle distance; and
setting the first parking path as the parking path having the longest average obstacle distance in response to a difference between the reference average obstacle distance and the first average obstacle distance being less than a set convergence distance.

4. The method of claim 3, wherein the changing the moving distance comprises:
setting the first parking path as a new reference parking path in response to a difference between the reference average obstacle distance and the first average obstacle distance being not less than the set convergence distance; and
performing the calculating the reference average obstacle distance, the changing respective moving distances in the reference parking path, the setting the first parking path as the parking path having the longest average obstacle distance, and the setting the first parking path as the new reference parking path using the new reference parking path as the reference parking path.

5. The method of claim 4, wherein additional conditions for finding the first parking path in the changing respective moving distances in the reference parking path are used such that:
a deviation between a X-axis coordinate of the unmanned driving vehicle at a virtual arrival location and a X-axis coordinate of the unmanned driving vehicle at a target arrival location is less than a X set limit value;
a deviation between a Y-axis coordinate of the unmanned driving vehicle at the virtual arrival location and a Y-axis coordinate of the unmanned driving vehicle at the target arrival location is less than a Y set limit value and;
a deviation between a directed angle of orientation of the unmanned driving vehicle at the virtual arrival location and a directed angle of orientation of the unmanned driving vehicle at the target arrival location is less than a directed angle set limit value.

6. The method of claim 4, wherein the changing respective moving distances in the reference parking path comprises:
calculating a reduced average obstacle distance in a reduced path among the plurality of candidate parking paths, which is a reduced average distance between the at least one near-to-path obstacle and the unmanned driving vehicle in the reduced path, wherein the reduced path is obtained as a result of reducing respective moving distances in the reference parking path by a reference set distance;
calculating an extended average obstacle distance in an extended path among the plurality of candidate parking paths, which is an extended average distance between the at least one near-to-path obstacle and the unmanned driving vehicle in the extended path, wherein the extended path is obtained as a result of extending respective moving distances in the reference parking path by the reference set distance;
changing the respective moving distances based on a result of comparing the reduced average obstacle distance in the reduced path to the extended average obstacle distance in the extended path; and
calculating the first average obstacle distance, which is the first average distance between the at least one near-to-path obstacle and the unmanned driving vehicle such that the first parking path is found in which the first average obstacle distance is longer than the reference average obstacle distance.

7. The method of claim 6, wherein in the changing respective moving distances, the respective moving distances in the reduced path is reduced in response to the reduced average obstacle distance in the reduced path being longer than the extended average obstacle distance in the extended path, and
wherein the first average obstacle distance, which is the first average distance between the at least one near-to-path obstacle and the unmanned driving vehicle, is calculated such that the first parking path is found in which the first average obstacle distance is longer than the reference average obstacle distance in response to the respective moving distances in the reduced path being reduced.

8. The method of claim 7, wherein in the changing respective moving distances, a rate of reducing the moving distance is proportional to a difference between the reduced average obstacle distance in the reduced path and the extended average obstacle distance in the extended path in response to respective moving distances being reduced in the reduced path.

9. The method of claim 6, wherein in the changing respective moving distances, in response to the extended average obstacle distance in the extended path being longer than the reduced average obstacle distance in the reduced path, the respective moving distances in the extended path are extended, and
wherein the first average obstacle distance, which is the first average distance between the at least one near-to-path obstacle and the unmanned driving vehicle, is calculated such that the first parking path is found, in which the first average obstacle distance is longer than the reference average obstacle distance.

10. The method of claim 9, wherein in the changing respective moving distances, a rate of extending the moving distance is proportional to a difference between the reduced average obstacle distance in the reduced path and the extended average obstacle distance in the extended path in response to respective moving distances being extended in the extended path.

11. An unmanned driving vehicle comprising:
a controller which is configured to execute:
generating a reference parking path by selectively combining a plurality of operations which comprise head-in straight driving, head-out straight driving, head-in left turning, head-out left turning, head-in right turning, and head-out right turning;
changing a moving distance in the reference parking path to find a parking path in which an average obstacle distance, which is an average distance between at least one near-to-path obstacle and the unmanned driving vehicle, is longest among a plurality of candidate parking paths;
setting the parking path having the longest average obstacle distance, as an optimum parking path, in response to the longest average obstacle distance being longer than a predetermined limited distance; and
performing a parking operation based on the optimum parking path,
wherein, in order to obtain the average distance between the at least one near-to-path obstacle and the unmanned driving vehicle in the parking path, the controller is configured to calculate a shortest distance between the at least one near-to-path obstacle and the unmanned driving vehicle in respective locations when assuming that positions of the unmanned driving vehicle are disposed to overlap with each other along the parking path , and total results of the calculated shortest distance, and set a value that is obtained by the totaling of the results as the average distance.

* * * * *